United States Patent Office 3,227,747
Patented Jan. 4, 1966

3,227,747
LIQUID PHASE PROCESS FOR THE PREPARATION OF UNSATURATED ESTERS BY THE OXIDATION OF OLEFINS WITH A GROUP VIII NOBLE METAL CATALYST IN THE PRESENCE OF AN ORGANIC COPPER SALT AND A NITRILE
David W. Lum, Cincinnati, and Karl Koch, Norwood, Ohio, assignors to National Distillers and Chemical Corporation, New York, N.Y., a corporation of Virginia
No Drawing. Filed May 2, 1962, Ser. No. 191,734
12 Claims. (Cl. 260—497)

This invention relates to a process for preparing unsaturated esters of organic acids. More particularly, it relates to a novel method for preparing unsaturated esters of organic acids from unsaturated organic compounds.

In recent years there has been an increased demand for unsaturated esters of organic acids in a variety of fields, such as in the preparation of polymers, copolymers, and resins from these polymers. In addition, these esters have been finding increased application in the synthesis of drugs and as chemical intermediates, such as acetylating agents. These increased demands have led to attempts to produce these esters in high yields by economical and efficient processes. Although it is not intended to limit this invention thereto, for convenience the present process will be discussed and illustrated in terms of vinyl acetate.

The first mention of vinyl acetate was in 1912 when Klatte obtained it as a by-product in the preparation of ethylidene diacetate by the direct combination of acetic acid and acetylene in the presence of a mercury salt. Vinyl acetate is now produced commercially by the reaction of acetylene with acetic acid or by the reaction of acetaldehyde with acetic anhydride. A major disadvantage of these processes is the relatively high cost of the reactants. This shows up to an even greater degree in the preparation of esters other than vinyl acetate, for example, in the synthesis of propenyl acetate from methyl acetylene.

According to an article by Moiseev et al., Doklady Akad. Nauk S.S.S.R. v. 133:377–380 (1960), vinyl acetate may be obtained by the reaction of (a) an ethylene-palladous chloride complex or (b) ethylene and palladous chloride with sodium acetate and anhydrous acetic acid in accordance with the equation

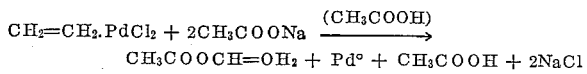

$CH_2=CH_2 \cdot PdCl_2 + 2CH_3COONa \xrightarrow{(CH_3COOH)}$
$CH_3COOCH=CH_2 + Pd^\circ + CH_3COOH + 2NaCl$ As may be seen in the equation, both sodium acetate and acetic acid were required for the reaction; experiments carried out by Moiseev et al. showed that the reaction of the complex with glacial acetic acid in the absence of sodium acetate gave no yield of vinyl acetate.

In a recent article by Stern et al. in the Proceedings of the Chemical Society, page 370 (October 1961), the complex $(C_2H_4PdCl_2)_2$ is reacted with acetic acid in isooctane in the presence of a buffer, disodium hydrogen phosphate, for sixteen hours at room temperature to give vinyl acetate. According to the article, vinyl acetate was produced also by shaking palladium chloride and disodium hydrogen phosphate in isooctane containing acetic acid for 120 hours at room temperature under an ethylene atmosphere.

It is an object of the present invention to provide a novel and effective method for the preparation of unsaturated esters from unsaturated organic compounds, substituted and unsubstituted, and organic cupric salts.

Another object of this invention is to prepare unsaturated esters of organic acids by a continuous, catalytic process that overcomes the disadvantages of the processes of the prior art.

It is another object of this invention to produce high yields of vinyl acetate from ethylene and cupric acetate in the presence of a nitrile solvent by a direct and efficient process.

Further objects of this invention will become apparent from the following description and embodiments.

In accordance with this invention, an organic cupric salt reacts with an unsaturated organic compound in the presence of a nitrile and a Group VIII noble metal catalyst or in a substantially anhydrous system to form an unsaturated ester.

The general reaction for preparing unsaturated esters by the process of this invention may be illustrated by the following equation

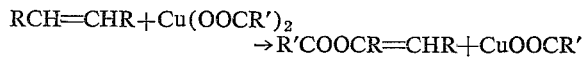

$RCH=CHR + Cu(OOCR')_2$
$\rightarrow R'COOCR=CHR + CuOOCR'$ wherein either or both R's represents hydrogen or a substituted or unsubstituted, branched or straight chain, aliphatic, cycloaliphatic or aromatic radical having from about 1 to about 16 carbon atoms per molecule, the total number of carbon atoms per molecule not exceeding 18. R' may be hydrogen or a substituted or unsubstituted, branched or straight chain, aliphatic, cycloaliphatic or aromatic radical having from about 1 to 17 carbon atoms.

The compound RCH=CHR may be any alkene, typical examples of which include ethylene, propylene, butene-1, isobutylene, hexene-1, isooctene, triisobutylene, styrene, p-chlorostyrene, butadiene, octadecane-1, allyl benzene, allyl acetate, ethyl acrylate, butene-2, pentane-2, pentene-3, hexadiene-1,5, and the like, and mixtures thereof.

The cupric salt $Cu(OOCR')_2$ that reacts with the unsaturated compound may be, for example cupric formate, acetate, chloroacetate, phenyl acetate, propionate, benzoate, isobutyrate, p-toluate, stearate, and the like, or mixtures thereof. Dicarboxylates such as the adipate may also be employed.

The catalyst may be any member of the platinum group or the palladium group of metals or a salt or an oxide thereof, either inorganic or organic. Preferably the catalyst is a Group VIII noble metal or a salt or oxide thereof, typical examples of which include palladium, platinum, rhodium, ruthenium, osmium, iridium, palladous benzoate, palladous acetate, palladous propionate, ruthenium acetate, platinous benzoate, rhodium acetate, palladous chloride, palladous bromide, palladous sulfate, platinum dichloride, rhodium trichloride, ruthenium oxide, ruthenium chloride, platinum oxide, palladium oxide, iridium chloride, and the like, or mixtures thereof. Salts containing the metal (II) valency, and especially palladium (II) metal salts, are preferred. The catalyst may be unsupported or supported on any suitable medium, such as silica, alumina, carbon, etc. Only catalytic amounts of catalyst need be employed, and specific amounts may vary from about 0.05 to about 10 weight percent, preferably about 0.2 to about 5 weight percent, based on the reaction mixture.

The solvent suitable for the present process must be comprised, at least in part, of a nitrile. The nitrile may be either a solid or, preferably, a liquid and has the general formula $R''C \equiv N$. $R''$ may be aliphatic, aromatic, cycloaliphatic and the like, or mixtures thereof, having about 1 to 17 carbon atoms, and preferably about 1 to 9 carbon atoms, per molecule. Examples of the nitrile include acetonitrile, propionitrile, isobutyronitrile, chloro acetonitrile, benzonitrile, p-tolunitrile, p-chloro-α-tolunitrile, lauronitrile, stearonitrile, or the like and mixtures thereof. Dinitriles such as adiponitrile, fumaronitrile, terephthalonitrile, sebaconitrile, etc., are also effective. In the absence of at least one nitrile little or no recycle of the catalyst metal by cupric salts is obtained. It has also been found that classes of compounds other than nitriles, such as esters, ethers, hydrocarbons, alcohols, amines, and the like are unsatisfactory, since they are either unstable under the reaction conditions or else they fail to promote the reoxidation of the catalyst metal by cupric salts. The nitrile generally comprises from about 20 up to about 100 volume percent of the total liquid reaction medium, with about 50 to 100 percent being preferred. The remaining portion of the liquid reaction medium, if desired, comprises an inert diluent or solvent that will tend to increase the solubility of the reactants, such as saturated aliphatic or aromatic hydrocarbons, e.g., benzene, toluene, hexane, isooctane, etc.; diphenyl ether; N,N-dimethyl acetamide; diethyl carbonate; and the like; or mixtures thereof.

It has been found that the addition of certain metal halide promoters in conjunction with the catalyst leads to increased retention of the catalyst metal in solution upon repeated recycling. Such metal halide promoters are preferably inorganic salts especially those of copper, e.g., cupric chloride or cupric bromide, but other metal halides such as ferric chloride, cobaltous chloride, sodium chloride, gold chloride, ferric bromide, and the like, or mixtures thereof, may also be used advantageously. In general, the metal halide promoter will be a salt different from the cupric salt, although in some cases excess cupric salt may function as a promoter. Generally, if a promoter is used, it is used in the amount of about 0.05 to about 2.0 parts by weight of the metal halide promoter per part of the cupric salt, e.g., cupric acetate.

The organic cupric salt, which is both the source of anions and an oxidant for the catalyst metal, is used in an amount varying from about 10 to about 100 grams per liter of total liquid reaction medium, with the preferred amount being in the range of about 50 to 500 grams per liter.

Neither the temperature nor the pressure at which the present reaction takes place is critical, being limited to the range in which the selected solvent mixture is maintained in liquid phase. The reaction of the unsaturated organic compound and the organic cupric salt is generally carried out at a temperature between about 0° and 250° C., and preferably between about 20° and 150° C., and at a pressure between about atmospheric and 5,000 p.s.i., and preferably between about atmospheric and 1,000 p.s.i.

The vinyl acetate is recovered and purified by distillation or other means known to the art.

The present process for the preparation of unsaturated esters of organic acids has several advantages over the processes of the art. Earlier processes require, for example, the use of sodium acetate or other buffer, such as disodium hydrogen phosphate, in addition to acetic acid in the synthesis of vinyl acetate. In the present process not only is no such buffer used, but also no acetic acid or other organic acid is used. In addition, the organic cupric salt in the present process is an oxidant for the catalyst metal, as well as a source of anions, thus increasing the recycle value of the palladium.

As mentioned before, the present invention is not intended to be limited to the synthesis of vinyl acetate. The reactions described herein are applicable to unsaturated compounds or alkenes other than compounds ethylenically unsaturated in the terminal position, such as ethylene. For example, butene-2 or styrene may be reacted with other organic cupric salts in the presence of a nitrile and a Group VIII noble metal catalyst to yield a mixture of unsaturated esters corresponding to the starting compounds.

The more detailed practice of the present invention is illustrated by the following examples. These examples are illustrative only and are not intended to limit the invention except as indicated by the appended claims.

*Example I*

100 ml. of acetonitrile, 0.70 gram of palladous benzoate (0.002 mole), and 50 grams of cupric acetate (0.25 mole) were placed in the glass liner of a Parr bomb and rocked under a cover of ethylene at 400 p.s.i. and 30° C. for 2½ days. Analysis of the reaction mixture by vapor phase chromatography demonstrated the presence of 11.6 millimoles of vinyl acetate.

*Example II*

100 ml. of acetonitrile, 0.70 gram of palladous benzoate (0.002 mole), and 50 grams of cupric acetate (0.25 mole) were stirred under ethylene at 50° C. and 21 p.s.i. for 24 hours. Analysis of the reaction mixture by vapor phase chromatography showed that 10.2 millimoles of vinyl acetate has been formed.

While there are above disclosed but a limited number of embodiments of the invention herein presented, it is possible to produce still other embodiments without departing from the inventive concept herein disclosed.

What is claimed is:

1. A liquid phase process for the preparation of unsaturated esters which comprises reacting an unsaturated organic compound selected from the group consisting of alkenes, butadiene, styrene, p-chlorostyrene, allyl acetate, allyl benzene, ethyl acrylate and hexadiene-1,5 with an organic cupric salt having the formula $Cu(OOCR')_2$, wherein $R'$ is selected from the group consisting of hydrogen, alkyl, aryl and chloroalkyl radicals having from 1 to 17 carbon atoms, in the presence of a nitrile having the formula $R''C\equiv N$ wherein $R''$ is selected from the group consisting of alkyl, aryl and chloroalkyl radicals having from 1 to 17 carbon atoms, and a catalytic amount of a solid, Group VIII noble metal-containing catalyst selected from platinum and palladium group metals, oxides and salts thereof, said reaction being carried out under substantially anhydrous conditions and in the absence of added organic acid.

2. The process of claim 1 wherein the unsaturated organic compound is ethylene.

3. The process of claim 1 wherein the catalyst is a palladium group metal-containing catalyst.

4. The process of claim 1 wherein the catalyst is a platinum group metal-containing catalyst.

5. A liquid phase process for the preparation of vinyl acetate which comprises reacting ethylene with cupric acetate in the presence of a nitrile having the formula $R''C\equiv N$, wherein $R''$ is selected from the group consisting of alkyl, aryl and chloroalkyl radicals having from 1 to 9 carbon atoms per molecule, and a catalytic amount of a solid, Group VIII noble metal-containing catalyst selected from platinum and palladium group metals, oxides and salts thereof, said reaction being carried out under substantially anhydrous conditions and in the absence of added organic acid.

6. The process of claim 5 wherein the nitrile is acetonitrile.

7. The process of claim 5 wherein the nitrile is benzonitrile.

8. The process of claim 5 wherein the catalyst is a platinum group metal-containing catalyst.

9. The process of claim 5 wherein the catalyst is a palladium group metal-containing catalyst.

10. The process of claim 5 wherein said catalyst is palladous benzoate.

11. A liquid phase process for the preparation of vinyl acetate which comprises reacting ethylene with cupric acetate in the presence of acetonitrile and a catalytic amount of palladous benzoate under substantially anhydrous conditions, said reaction being carried out in the absence of added organic acid.

12. The process of claim 11 wherein said reaction is carried out at a temperature of about 20° to 150° C. and at a pressure between about atmospheric and 5,000 p.s.i.

References Cited by the Examiner
FOREIGN PATENTS
137,511    4/1960    U.S.S.R.

OTHER REFERENCES

Kharasch: J.A.C.S., vol. 60, pp. 882–884 (1938).
Moiseev, Doklady Akademii Nauk U.S.S.R., vol. 133, pp. 337–380 (1960).

LORRAINE A. WEINBERGER, *Primary Examiner.*
A. H. WINKELSTEIN, LEON ZITVER, *Examiners.*
A. E. TANENHOLTZ, D. P. CLARKE, V. GARNER, *Assistant Examiners.*